United States Patent
Woolaway et al.

(10) Patent No.: US 7,750,301 B1
(45) Date of Patent: Jul. 6, 2010

(54) MICROBOLOMETER OPTICAL CAVITY TUNING AND CALIBRATION SYSTEMS AND METHODS

(75) Inventors: James T. Woolaway, Santa Barbara, CA (US); Austin A. Richards, Santa Barbara, CA (US)

(73) Assignee: Flir Systems, Inc., Wilsonville, OR (US)

( * ) Notice: Subject to any disclaimer, the term of this patent is extended or adjusted under 35 U.S.C. 154(b) by 268 days.

(21) Appl. No.: 11/865,927

(22) Filed: Oct. 2, 2007

(51) Int. Cl.
*G01J 5/02* (2006.01)
(52) U.S. Cl. .................. 250/339.09; 359/247; 359/254; 359/290
(58) Field of Classification Search ............ 250/339.09, 250/214 R; 359/247, 254, 290
See application file for complete search history.

(56) References Cited

U.S. PATENT DOCUMENTS

| | | | |
|---|---|---|---|
| 5,021,663 A | 6/1991 | Hornbeck | |
| 5,220,188 A | 6/1993 | Higashi et al. | |
| 5,220,189 A | 6/1993 | Higashi et al. | |
| 5,286,976 A | 2/1994 | Cole | |
| 5,293,041 A | 3/1994 | Kruse, Jr. | |
| 5,300,915 A | 4/1994 | Higashi et al. | |
| 5,420,419 A | 5/1995 | Wood | |
| 5,449,910 A | 9/1995 | Wood et al. | |
| 5,450,053 A | 9/1995 | Wood | |
| 5,534,111 A | 7/1996 | Hocker et al. | |
| 5,550,373 A * | 8/1996 | Cole et al. | ............... 250/338.1 |
| 5,656,816 A * | 8/1997 | Tanaka | ................... 250/339.01 |
| 5,756,999 A | 5/1998 | Parrish et al. | |
| 5,895,233 A | 4/1999 | Higashi et al. | |
| 6,028,309 A | 2/2000 | Parrish et al. | |
| 6,036,872 A | 3/2000 | Wood et al. | |
| 6,489,614 B1 * | 12/2002 | Deguchi et al. | .......... 250/338.1 |
| 6,495,829 B1 * | 12/2002 | Oda | ...................... 250/339.02 |
| 6,803,555 B1 | 10/2004 | Parrish et al. | |
| 6,900,440 B2 | 5/2005 | Reed et al. | |
| 7,034,301 B2 | 4/2006 | Parrish et al. | |
| 2004/0217264 A1 * | 11/2004 | Wood et al. | ............. 250/214 R |
| 2007/0029484 A1 | 2/2007 | Anderson et al. | |

OTHER PUBLICATIONS

Almasri et al., Amorphous Silicon Two-Color Microbolometer for Uncooled IR Detection, IEEE Sensors Journal, vol. 6, No. 2, Apr. 2006, 8 pages.
Reed et al, High Sensitivity Infrared Sensing Apparatus, University of Virginia, May 31, 2005, 1 page.

* cited by examiner

*Primary Examiner*—David P Porta
*Assistant Examiner*—Jessica L Eley
(74) *Attorney, Agent, or Firm*—Haynes and Boone, LLP

(57) ABSTRACT

Systems and methods are disclosed herein, as an example, to provide microbolometer resonant cavity tuning techniques and calibration techniques in accordance with one or more embodiments of the present invention. For example, in accordance with one embodiment, a method of operating an array of microbolometers on a substrate of an infrared camera system includes filtering infrared radiation to pass a first infrared radiation wavelength and to block a second infrared radiation wavelength, wherein the first infrared radiation wavelength is different than the second infrared radiation wavelength; setting a spacing between the microbolometers and the substrate to approximately tune the microbolometers to the second infrared radiation wavelength which is blocked by the filtering; and determining calibration data for the microbolometers.

20 Claims, 12 Drawing Sheets

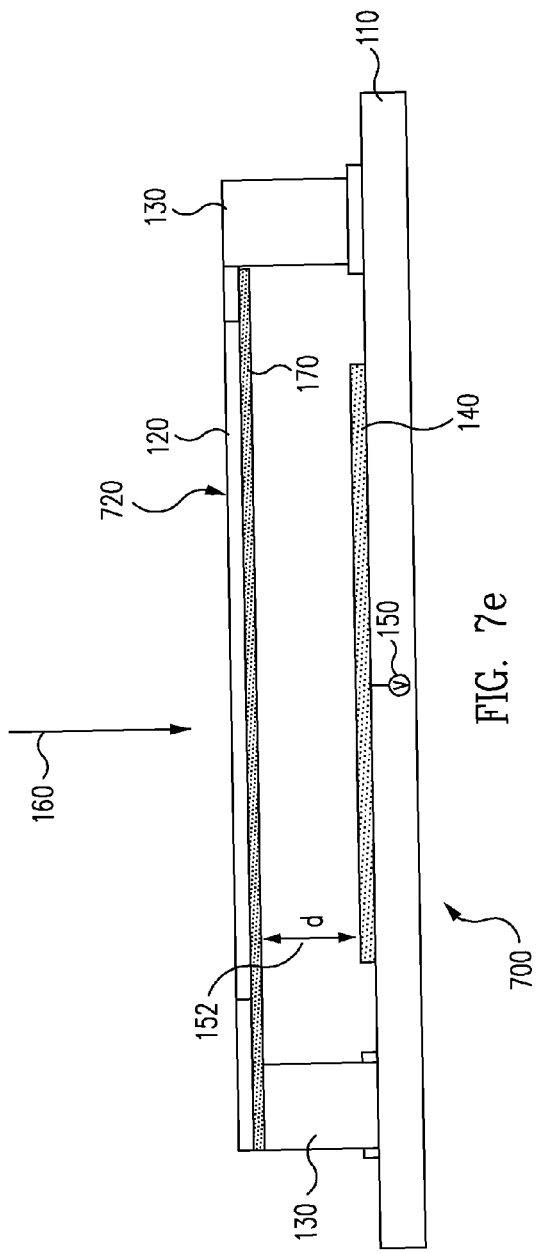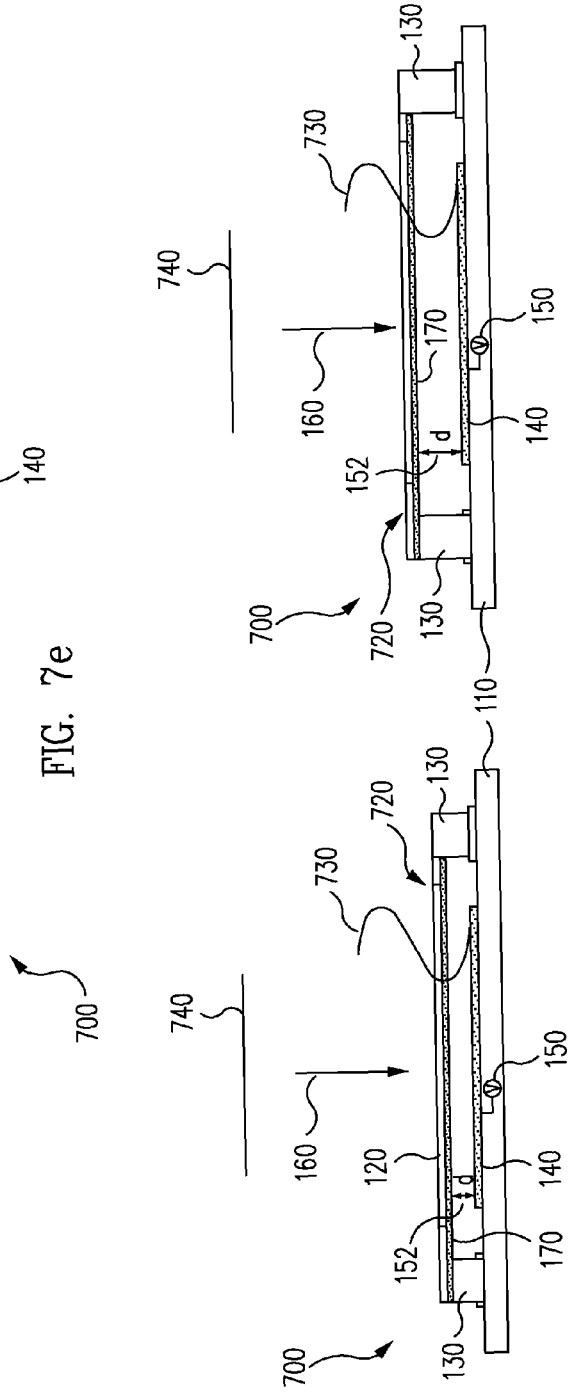

US 7,750,301 B1

MICROBOLOMETER OPTICAL CAVITY TUNING AND CALIBRATION SYSTEMS AND METHODS

TECHNICAL FIELD

The present invention relates generally to infrared cameras and, more particularly, to techniques for tuning microbolometer optical cavities and calibrating for infrared camera applications.

BACKGROUND

The microbolometer (or bolometer) operates on the principle that the electrical resistance of the microbolometer material changes with respect to the microbolometer temperature, which in turn changes in response to the quantity of absorbed incident infrared radiation. These characteristics may be exploited to measure incident infrared radiation on the microbolometer by sensing the resulting change in its resistance.

Modern microbolometer structures are typically fabricated on monolithic silicon substrates to form an array of microbolometers, with each microbolometer functioning as a pixel to produce a two-dimensional image. The change in resistance of each microbolometer is translated into a time-multiplexed electrical signal by circuitry known as the read out integrated circuit (ROIC), which is typically formed within the silicon substrate upon which the microbolometer array is fabricated. The combination of the ROIC and the microbolometer array is commonly known as a microbolometer focal plane array (FPA) or microbolometer infrared FPA.

The microbolometer is generally thermally isolated from its supporting substrate or surroundings by forming an airbridge structure (microbolometer bridge or microbridge) to allow the absorbed incident infrared radiation to generate a temperature change in the microbolometer material. For example, a conventional microbolometer array structure may be formed as a two-dimensional array of closely spaced airbridge structures that are coated with a temperature sensitive resistive material, such as vanadium oxide, that absorbs infrared radiation.

The conventional air-bridge structure (which may refer to and be implemented as a vacuum-gap structure) provides good thermal isolation between the microbolometer and the silicon substrate and also forms a resonant cavity structure for improved infrared absorption, with the silicon substrate typically coated with a reflective material to reflect the infrared radiation back to the microbolometer. Thus, the air-gap thickness (i.e., the approximate distance between the reflective material and the air-bridge structure) may determine to a substantial degree the infrared absorption characteristics and spectral response of the microbolometers.

A drawback of a conventional microbolometer FPA is that the air-gap thickness is fixed during the manufacturing process and, consequently, the spectral response of the microbolometer array is limited by the resonant cavity structure formed during the manufacturing process. Another drawback, for example, of a conventional microbolometer FPA is that a mechanical shutter is typically required to calibrate the microbolometer FPA, with the mechanical shutter often being relatively difficult to manufacture, with certain labor intensive and expensive manufacturing processes. Furthermore, the mechanical shutter may be viewed as being a slow mechanism relative to the electronics and microbolometer FPA capabilities, with the mechanical shutter typically having a number of mechanical components that may degrade the reliability, may increase power consumption, and possibly reduce the performance of an infrared camera incorporating the microbolometer FPA.

As a result, there is a need for improved techniques for detecting infrared radiation with microbolometer FPAs and, for example, calibrating the microbolometer FPA.

SUMMARY

Systems and methods are disclosed herein, as an example, to provide microbolometer resonant cavity tuning and calibration techniques in accordance with one or more embodiments of the present invention. As an example for an embodiment, a microbolometer resonant cavity may be tuned to calibrate the microbolometer, with the calibration process performed without the use of a conventional mechanical shutter.

For example, in accordance with an embodiment of the present invention, an infrared camera system includes an optical element adapted to pass infrared frequencies of a first range of wavelengths and block infrared frequencies of a second range of wavelengths; a substrate; a plurality of microbolometers coupled to the substrate to form corresponding microbolometer resonant cavities, wherein the microbolometers are disposed to receive the first range of wavelengths passed by the optical element; a plurality of reflective layers disposed on the substrate and corresponding to the plurality of microbolometers; and at least one voltage source adapted to provide a variable voltage potential to vary a spacing of the microbolometer resonant cavities between the reflective layers and the corresponding microbolometers, wherein the at least one voltage source is adapted to provide at least a first voltage potential during a calibration process of the microbolometers to set the spacing corresponding to the microbolometers detecting the second range of wavelengths.

In accordance with another embodiment of the present invention, an infrared camera system includes an optical element adapted to pass an infrared frequency of a first wavelength and block an infrared frequency of a second wavelength; a microbolometer focal plane array comprising: a substrate; and an array of microbolometers disposed on the substrate and forming a corresponding cavity between each of the microbolometers and the substrate; and means for varying a dimension of the cavity for each of the microbolometers to vary spectral absorption properties of the microbolometers, wherein the varying means sets the dimension of the cavities to tune the spectral absorption properties of the microbolometers to the second wavelength during calibration.

In accordance with another embodiment of the present invention, a method of operating an array of microbolometers on a substrate of an infrared camera system includes filtering infrared radiation to pass a first infrared radiation wavelength and to block a second infrared radiation wavelength, wherein the first infrared radiation wavelength is different than the second infrared radiation wavelength; setting a spacing between the microbolometers and the substrate to approximately tune the microbolometers to the second infrared radiation wavelength which is blocked by the filtering; and determining calibration data for the microbolometers.

In accordance with another embodiment of the present invention, a microbolometer focal plane array includes a substrate; a plurality of microbolometers coupled to the substrate and elevated above the substrate to form corresponding microbolometer resonant cavities; a plurality of reflective layers disposed on the substrate and corresponding to the plurality of microbolometers; and a voltage source coupled to at least one of the reflective layers and configured to provide a variable voltage bias to the reflective layer to change a spacing between the reflective layer and the corresponding microbolometer.

In accordance with another embodiment of the present invention, an infrared camera system includes a microbolometer focal plane array that includes a substrate; and an array of microbolometers disposed on the substrate and forming a corresponding cavity between each of the microbolometers and the substrate. The infrared camera system further includes interface system electronics coupled to the microbolometer focal plane array that includes means for varying a dimension of the cavity for each of the microbolometers to vary spectral absorption properties of the microbolometers.

In accordance with another embodiment of the present invention, a method of varying a response of a microbolometer includes providing a first voltage level to a corresponding substrate of the microbolometer, wherein the first voltage level determines a first spacing between the substrate and the microbolometer; and providing a second voltage level to the corresponding substrate of the microbolometer, wherein the second voltage level determines a second spacing between the substrate and the microbolometer, wherein the second spacing is different than the first spacing.

In accordance with another embodiment of the present invention, a method of tuning an array of microbolometers on a substrate of an infrared camera system includes moving each of the microbolometers to a corresponding first spacing from the substrate to provide a first response over a first range of wavelengths; and moving each of the microbolometers to a corresponding second spacing from the substrate to provide a second response over a second range of wavelengths, wherein the first spacing is different than the second spacing.

In accordance with another embodiment of the present invention, a microbolometer focal plane array includes a substrate; a plurality of microbolometers coupled to the substrate and elevated above the substrate to form corresponding microbolometer resonant cavities, wherein each of the microbolometers includes a biasing layer configured to provide an approximately uniform voltage reference plane; a plurality of reflective layers disposed on the substrate and corresponding to the plurality of microbolometers; and a voltage source coupled to at least one of the reflective layers and configured to provide a variable voltage bias to the reflective layer, relative to the voltage reference plane of the biasing layer, to change a spacing between the reflective layer and the corresponding microbolometer.

In accordance with another embodiment of the present invention, an infrared camera system includes a microbolometer focal plane array having a substrate; and an array of microbolometers disposed on the substrate and forming a corresponding cavity between each of the microbolometers and the substrate, wherein each microbolometer includes a conductive layer corresponding to a reflective layer on the substrate; and interface system electronics coupled to the microbolometer focal plane array and having means for varying a dimension of the cavity for each of the microbolometers, based on a voltage potential difference between the conductive layer and the reflective layer associated with each of the microbolometers, to vary spectral absorption properties of the microbolometers.

In accordance with another embodiment of the present invention, a method of varying a response of a microbolometer includes providing a first voltage potential difference between a biasing layer of the microbolometer and a corresponding portion of substrate which forms a resonant cavity for the microbolometer, wherein the first voltage potential difference determines a first spacing between the substrate and the microbolometer; and providing a second voltage potential difference between the biasing layer of the microbolometer and the corresponding portion of substrate, wherein the second voltage potential difference determines a second spacing between the substrate and the microbolometer, wherein the second spacing is different than the first spacing.

In accordance with another embodiment of the present invention, a method of tuning an array of microbolometers on a substrate of an infrared camera system includes moving each of the microbolometers having a biasing layer to a corresponding first spacing from the substrate to provide a first response over a first range of wavelengths; and moving each of the microbolometers having the biasing layer to a corresponding second spacing from the substrate to provide a second response over a second range of wavelengths, wherein the first spacing is different than the second spacing.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
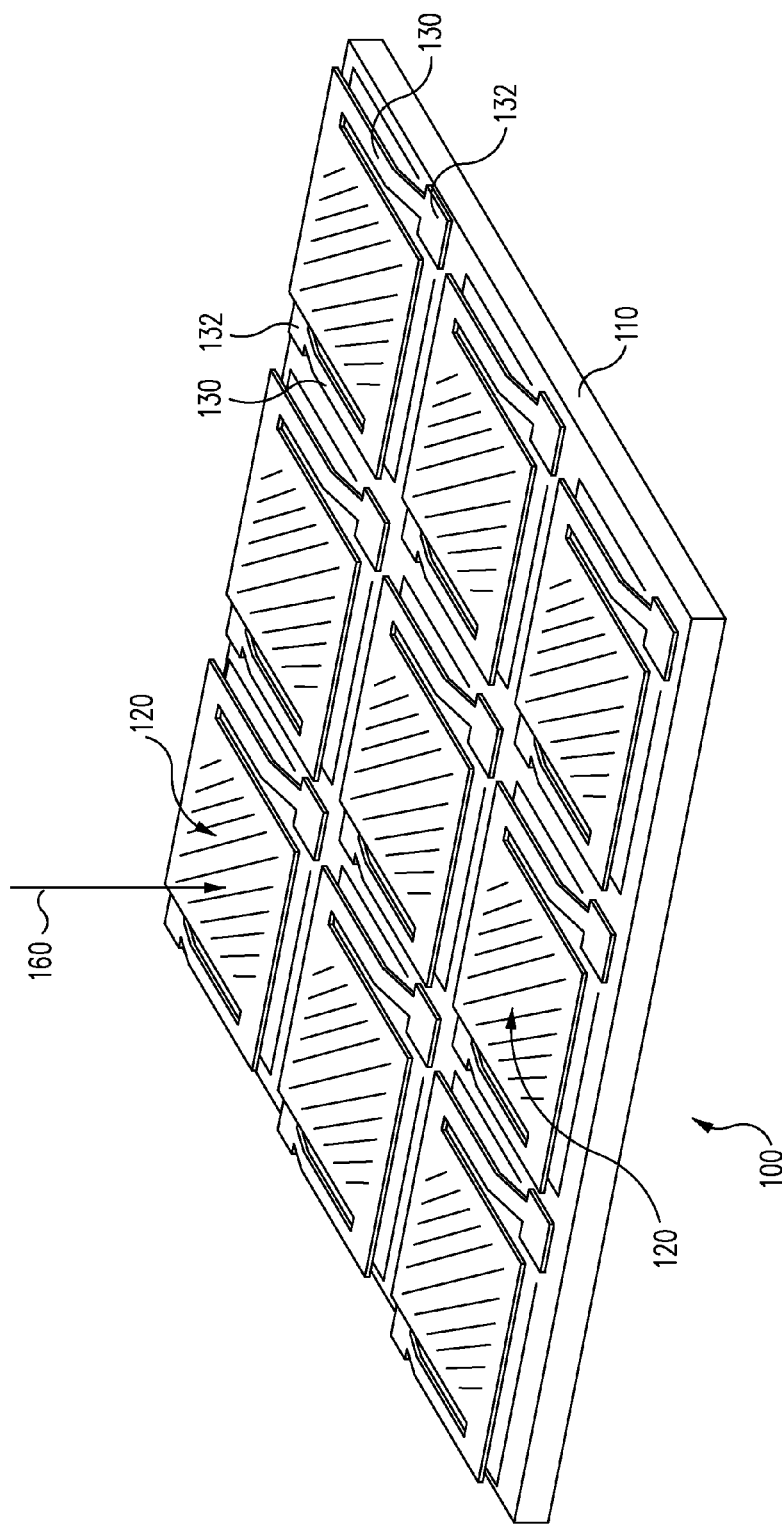
FIG. 1 shows a perspective view illustrating a microbolometer array in accordance with an embodiment of the present invention.

FIG. 1 shows a perspective view illustrating a microbolometer array 100 in accordance with an embodiment of the present invention. Microbolometer array 100 includes a substrate 110 and nine microbolometers 120 (e.g., a three-by-three array of microbolometers 120) to receive infrared radiation (indicated generally by an arrow 160). In general, microbolometer array 100 is shown as an exemplary three-by-three microbolometer FPA, but this is not limiting as the array may be of any desired size (e.g., from one microbolometer to a 512 by 512 array or larger), depending for example upon the application requirements.

Microbolometers 120 are elevated above substrate 110 by legs 130 (to form the air-bridge structure or vacuum-gap), which provide structural support and electrically connect microbolometers 120 with substrate 110. Substrate 110 (e.g., a silicon substrate) may include unit cell circuitry and may also include the ROIC for microbolometer array 100 (e.g., microbolometer FPA) as would be understood by one skilled in the art.

As an example, microbolometer 120 includes a resistive material layer having a high temperature coefficient of resistivity (TCR) material (e.g., vanadium oxide (VOx) or amorphous silicon), with legs 130 coupling the resistive material of microbolometer 120 (e.g., via a leg metal to resistive metal contact) to contacts 132 on substrate 110. However, this is not limiting and, in general, microbolometers 120 may be constructed in a conventional manner with various types of conventional materials.

In general, a theoretical model of a microbolometer array (microbridge array) would use a material that is a perfect blackbody absorber (i.e., equally absorbing all wavelengths of infrared radiation). However, because a microbridge has to be quite thin (e.g., approximately 500 nm) to have low thermal mass (and provide a sensor with a short time constant), all conventional process-compatible materials (e.g., silicon and the resistance material deposited on the silicon) are generally quite transparent. Consequently, due to the optical properties of the microbridge, the first pass of incident radiation is generally not efficiently absorbed by the microbridge.

For example, the "raw" absorption may be about fifteen percent, which is typically far too low to make a useful microbolometer sensor for the desired performance and with typical optics (e.g., f/1.4 to f/2). However, the resonant cavity structure of the microbolometer (the microbridge and the highly reflective substrate) greatly enhances infrared radiation absorption by providing multiple passes of the incident radiation. The operation may be viewed as behaving similar to a Fabry-Perot interferometer having a semi-transparent boundary condition (e.g., the microbridge) and a highly reflective boundary (e.g., the substrate) spaced about one-quarter wavelength away.

As an example, the microbridge may be made of silicon with a layer of vanadium oxide deposited on the silicon to form a resistor with a high TCR. However in accordance with one or more embodiments of the present invention, it should be understood that this example of a microbridge implementation is not limiting and that the microbolometer and microbridge structure may be implemented using various types of conventional materials (e.g., silicon dioxide, silicon nitride, amorphous silicon, titanium nitride, and/or vanadium oxide) and that the principles disclosed herein may be applied to various types of microbolometer structures made with various conventional materials, as would be understood by one skilled in the art.

Figure 2:
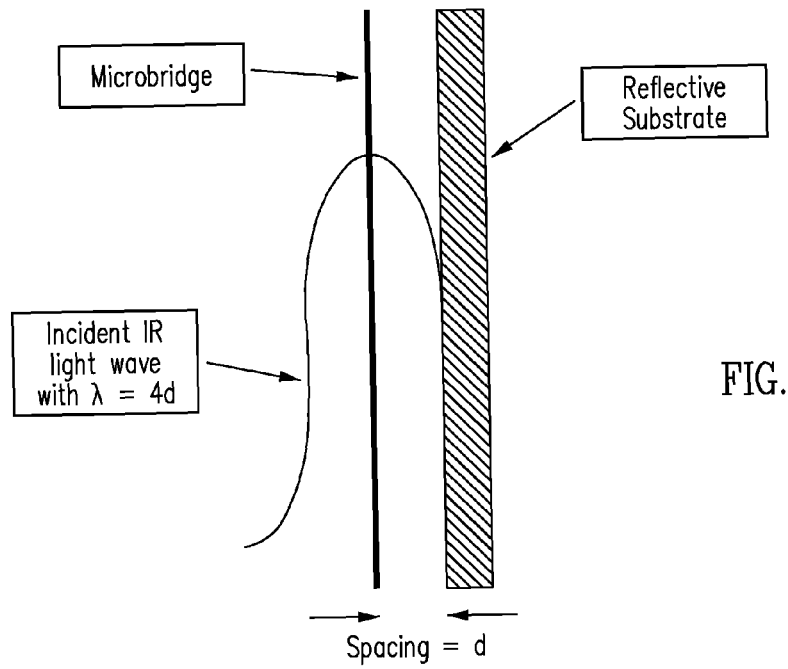
FIG. 2 shows a side view illustrating a portion of a microbolometer in accordance with an embodiment of the present invention.

The microbridge absorbs infrared radiation that is imaged onto it by the detector's optics. Any light that passes through the microbridge reflects off the substrate back towards the optics. If the wavelength of the incident light is exactly four times the cavity spacing, and the incident light has the correct phase relative to the microbridge, then incident light has a node at the substrate and the reflected wave reaches an antinode at the microbridge, as illustrated in FIG. 2. An antinode may represent a peak in the electric field of a light wave, and thus there is maximum absorption of photons if an absorbing material is located at an antinode.

Any reflected component from the microbridge returns to the substrate again, is reflected, and again forms an antinode at the microbridge. This process repeats until the incident wave energy is absorbed by the microbridge (the dominant mechanism), absorbed by the substrate (e.g., less than ten percent), or reradiated back towards the optics (e.g., less than ten percent). In general, the microbridge absorption may reach ninety percent at the peak wavelength, where the peak wavelength is approximately equal to $4d$, and "d" is the spacing between the microbridge and the substrate (as shown in FIG. 2). As an example, d may be set to approximately 2.5 micrometers, which in a classical interference model leads to a peak absorption at approximately ten micrometers wavelength (e.g., approximately the peak of the Planck spectral radiance curve (in power units) at terrestrial temperatures of 300 K).

In more specific terms, the phenomena of resonant absorption may be considered in terms of wave phenomena, with the cavity model also taking into account phase relationships. For example, the microbridge and the substrate may be viewed as forming a resonant cavity which has a high Q at the resonance wavelength of $4d$. The damping mechanism in this resonant system is the microbolometer structure itself, which ends up absorbing the bulk of the radiation, leading to measurable absorption efficiencies as high as ninety percent or more, as noted above.

Figure 3:
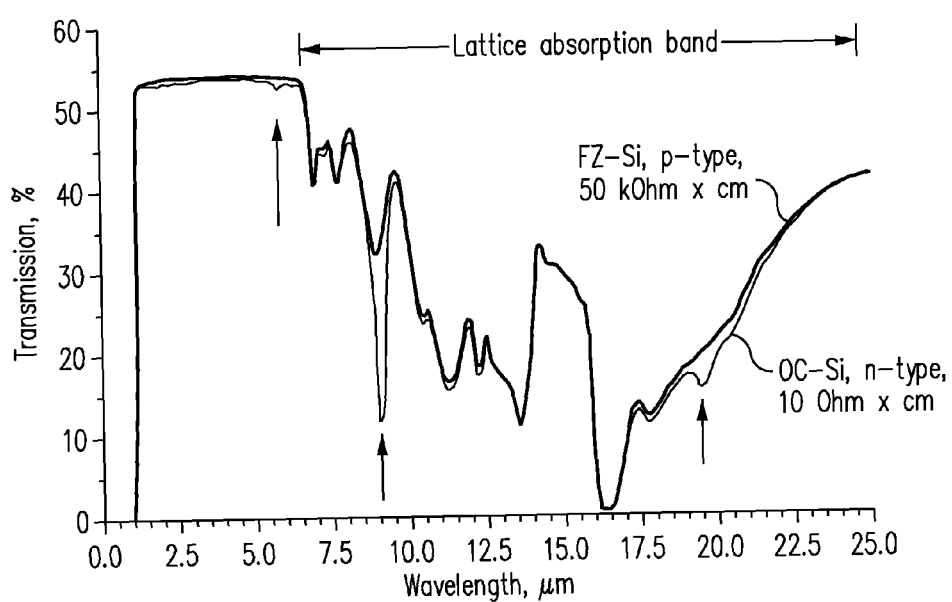
FIG. 3 shows exemplary transmission curves for silicon.

In typical applications, the silicon itself may have intrinsic lattice absorption that begins around six micrometers, which results in a deviation from a classical two-boundary resonant cavity model to a more complex spectral absorption curve that is often found in actual infrared sensor arrays. For example, FIG. 3 shows the transmission curves for five millimeter thick samples of two forms of silicon, with the absorption at a given wavelength, by conservation of energy, equal to one minus the transmission and minus the reflectance.

For this example, the reflectance of an incident light wave is due generally to Fresnel reflection (e.g., the change of refractive index experienced by the light wave as it passes from the vacuum to the material or out again). As a specific example, for a five hundred nanometer thick microbridge, the absorption will be much lower than FIG. 3 may indicate, simply because there is far less material in the optical path. In general, FIG. 3 may be viewed as illustrating that the silicon material has complex optical properties, and therefore, generally may not be treated as a greybody absorber in a typical microbridge cavity model.

In accordance with one or more embodiments of the present invention, if the resonant cavity spacing is modified (e.g., by mechanical movement of the microbridge), then the spectral properties of the resonant cavity are modified. For example, a larger spacing (i.e., "d" increased) will enhance longer wavelength absorption, while a smaller spacing (i.e., "d" decreased) will enhance shorter wavelength absorption. As a specific implementation example, the resonant cavity spacing may be varied by placing an electric charge on the microbridge (e.g., suspended by legs with a relatively weak spring constant) and varying an electrical bias on the substrate (e.g., the reflective layer on the substrate).

Thus, the microbridge will move away or towards the substrate by varying the potential difference (e.g., the voltage difference and/or polarity difference) between the electrically charged substrate and the electrically charged microbridge, which will result in a variation of the spectral response of the microbolometer. As an example, a microbolometer designed for a spectral response peak at ten micrometers, may provide an enhanced spectral response between seven and nine micrometers when the microbridge is drawn closer to the substrate (due to the decreased resonant cavity spacing). Consequently in accordance with one or more embodiments of the present invention, tunable microbolometers may be provided for various multi-spectral applications as discussed further herein.

Figure 4:
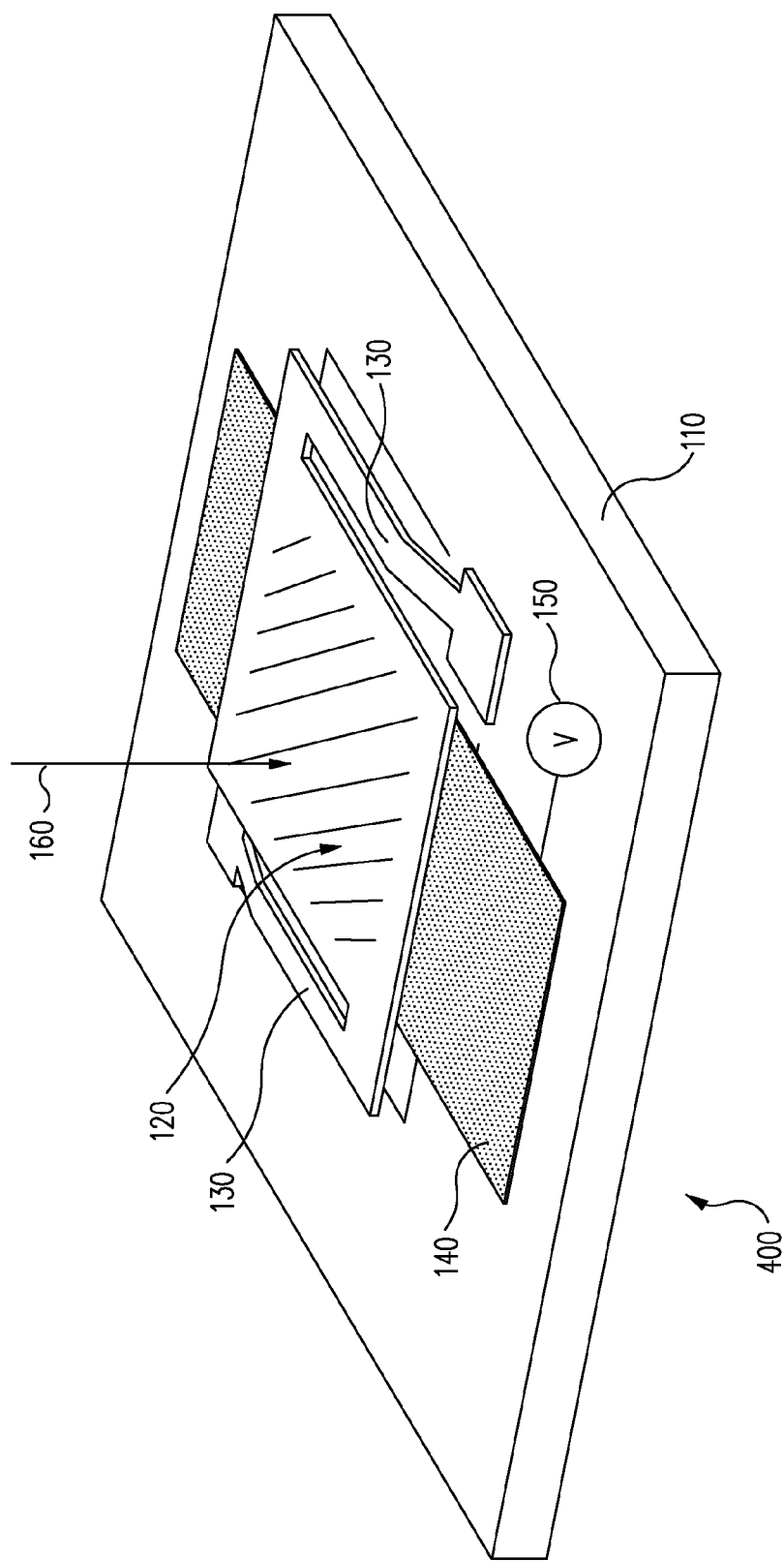
FIG. 4 shows a perspective view illustrating a microbolometer in accordance with an embodiment of the present invention.

As an example, FIG. 4 shows a perspective view illustrating a microbolometer array 400 in accordance with an embodiment of the present invention. Microbolometer array 400 may represent a portion of microbolometer array 100 (FIG. 1), with only one microbolometer 120 and associated substrate 110 shown for clarity to illustrate certain aspects of an embodiment of the present invention.

Microbolometer array 400 includes a reflective layer 140 on substrate 110 and below microbolometer 120. Reflective layer 140 may represent a conventional reflective layer, such as a thin film metal layer (e.g., made of aluminum or platinum), which is deposited on substrate 110 and forms the reflective surface of the resonant cavity for microbolometer 120.

In accordance with an embodiment of the present invention, a voltage source 150 is provided for reflective layer 140. Voltage source 150 may be used to vary the voltage potential difference between reflective layer 140 and microbolometer 120, which as discussed herein, results in a change in the distance (d) between reflective layer 140 and microbolometer 120 and thus, a change in the spectral response of microbolometer 120. Although voltage source 150 is disclosed for varying the voltage potential, any number of alternative techniques may be implemented, as would be understood by one skilled in the art, for varying a bias or voltage potential difference between microbolometer 120 and substrate 110 (e.g., reflective layer 140) in accordance with one or more embodiments of the present invention.

Figure 5:
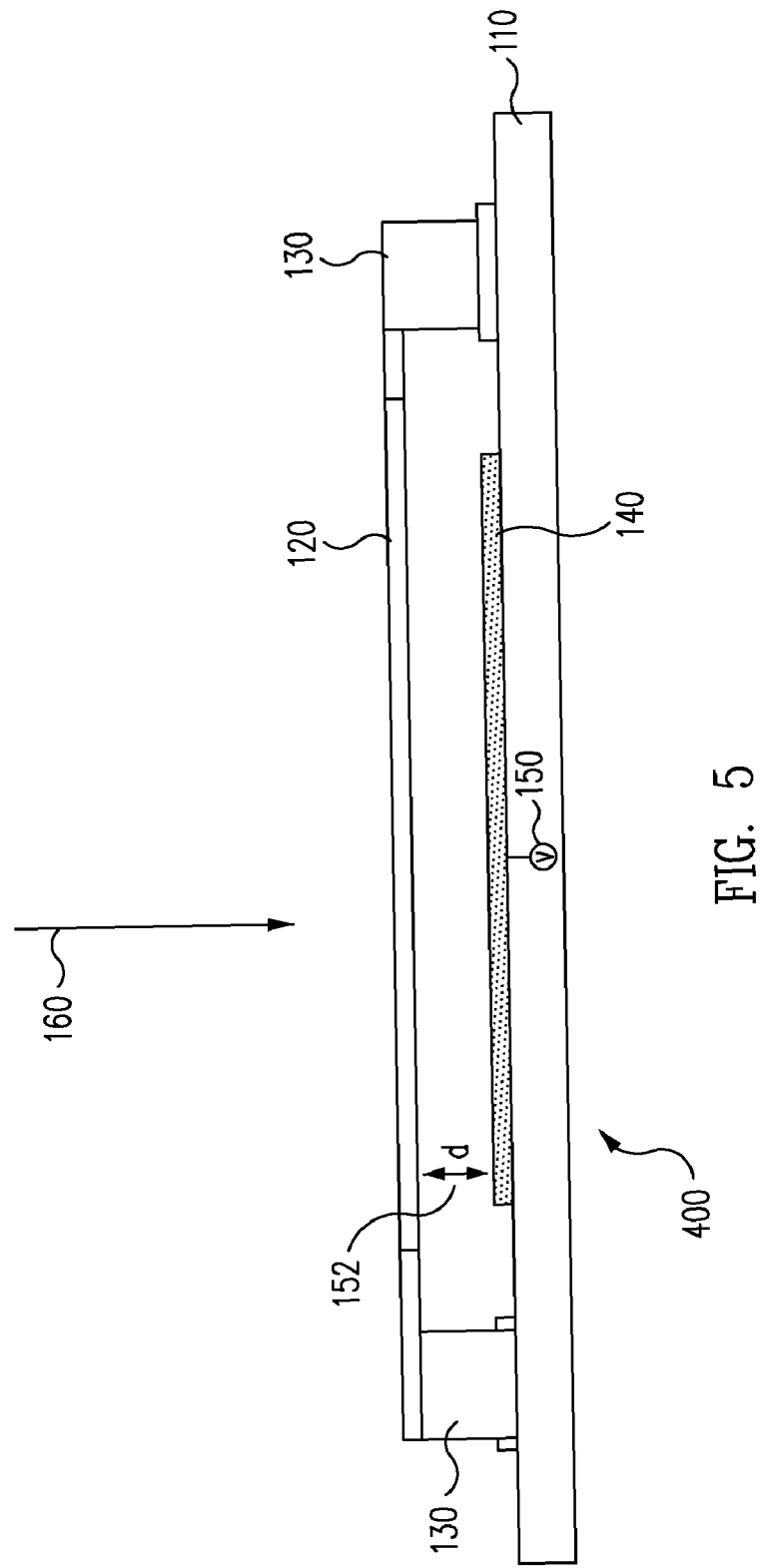
FIGS. 5-7b show side views illustrating a microbolometer in accordance with an embodiment of the present invention.

FIGS. 5-7b show side views illustrating voltage biasing of microbolometer array 400 in accordance with an embodiment of the present invention. FIG. 5 may represent a neutral or preset voltage biasing (or no voltage biasing) by voltage source 150 to provide a certain spacing (labeled "d" and indicated generally by an arrow 152) between microbolometer 120 and reflective layer 140.

Figure 6:
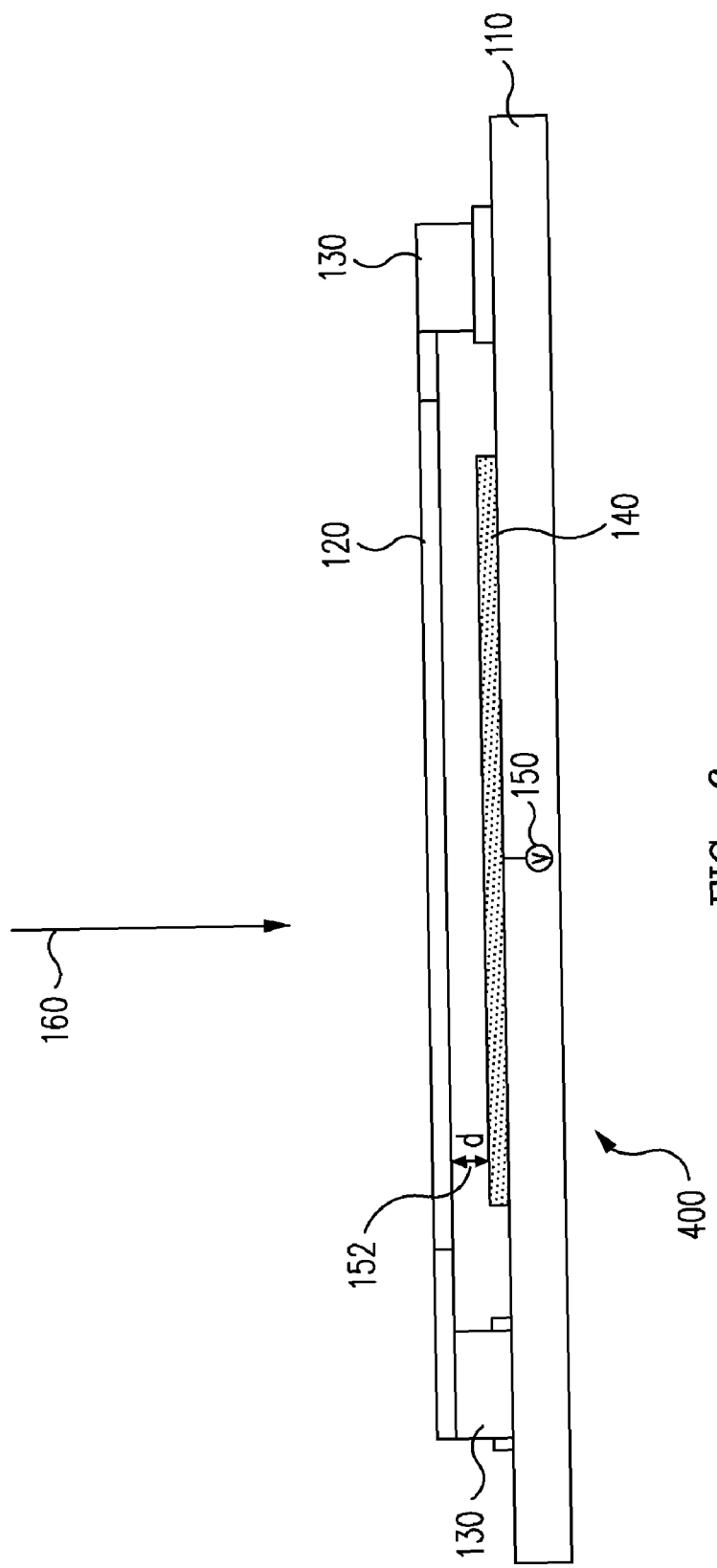

FIG. 6 illustrates a change (e.g., increase) in the voltage biasing by voltage source 150 to provide a decrease in the spacing (d) between microbolometer 120 and reflective layer 140 as compared to the spacing (d) of the preset voltage biasing of FIG. 5. Consequently, microbolometer 120 may provide improved spectral response performance with respect to shorter wavelengths (i.e., improved shorter wavelength absorption).

Figure 7A:
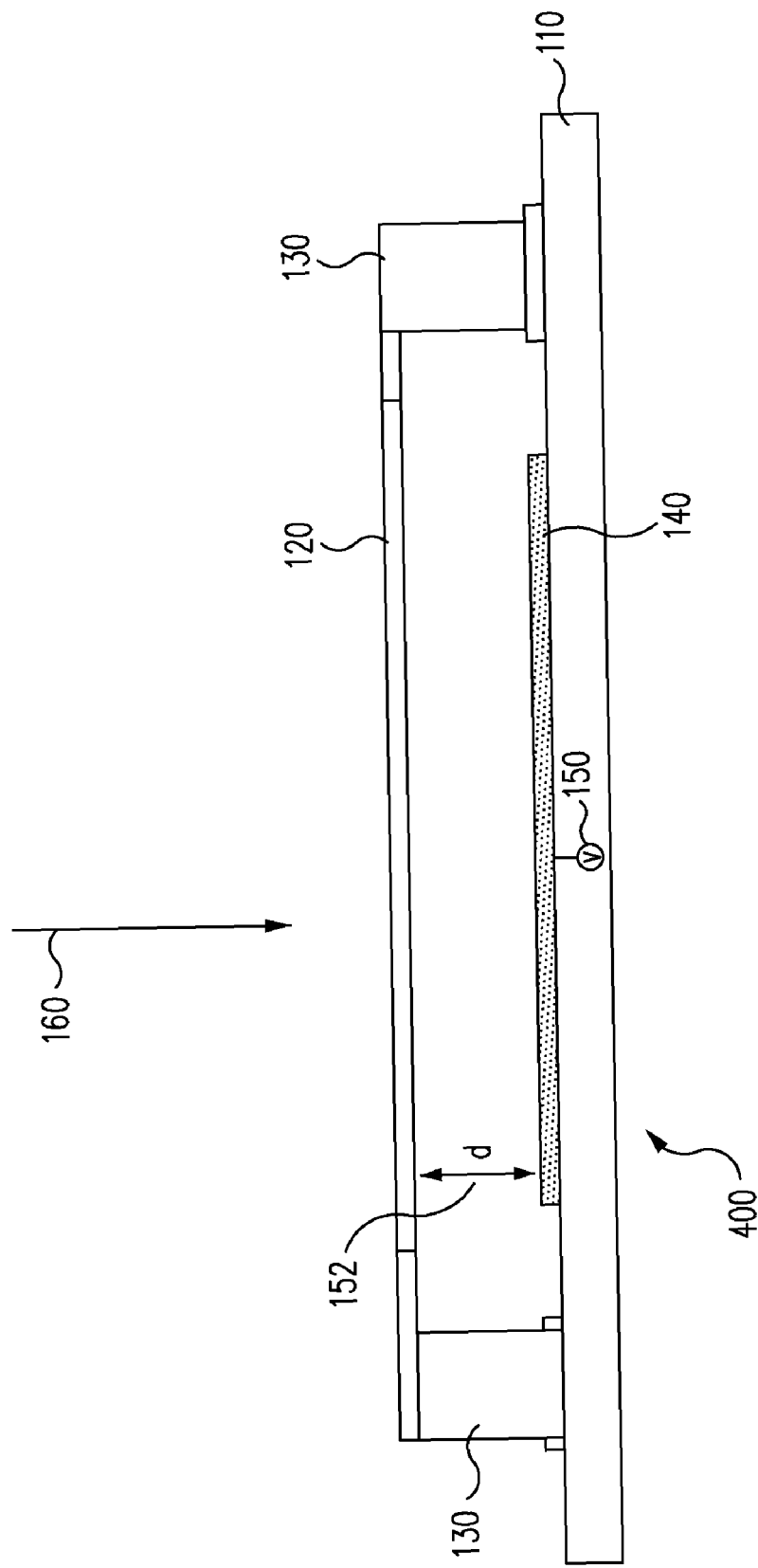
FIGS. 7c-7e show side views illustrating a microbolometer in accordance with an embodiment of the present invention.
FIGS. 7f and 7g show side views illustrating techniques for calibrating a microbolometer in accordance with an embodiment of the present invention.

FIG. 7a illustrates the increase in the spacing (d) between microbolometer 120 and reflective layer 140 due to a change (e.g., decrease) in the voltage biasing provided by voltage source 150 as compared to the voltage biasing of FIG. 5. Consequently, microbolometer 120 may provide improved spectral response performance with respect to longer wavelengths (i.e., improved longer wavelength absorption) due to the increased spacing (d) relative to the spacing (d) of FIG. 5.

Figure 7B:
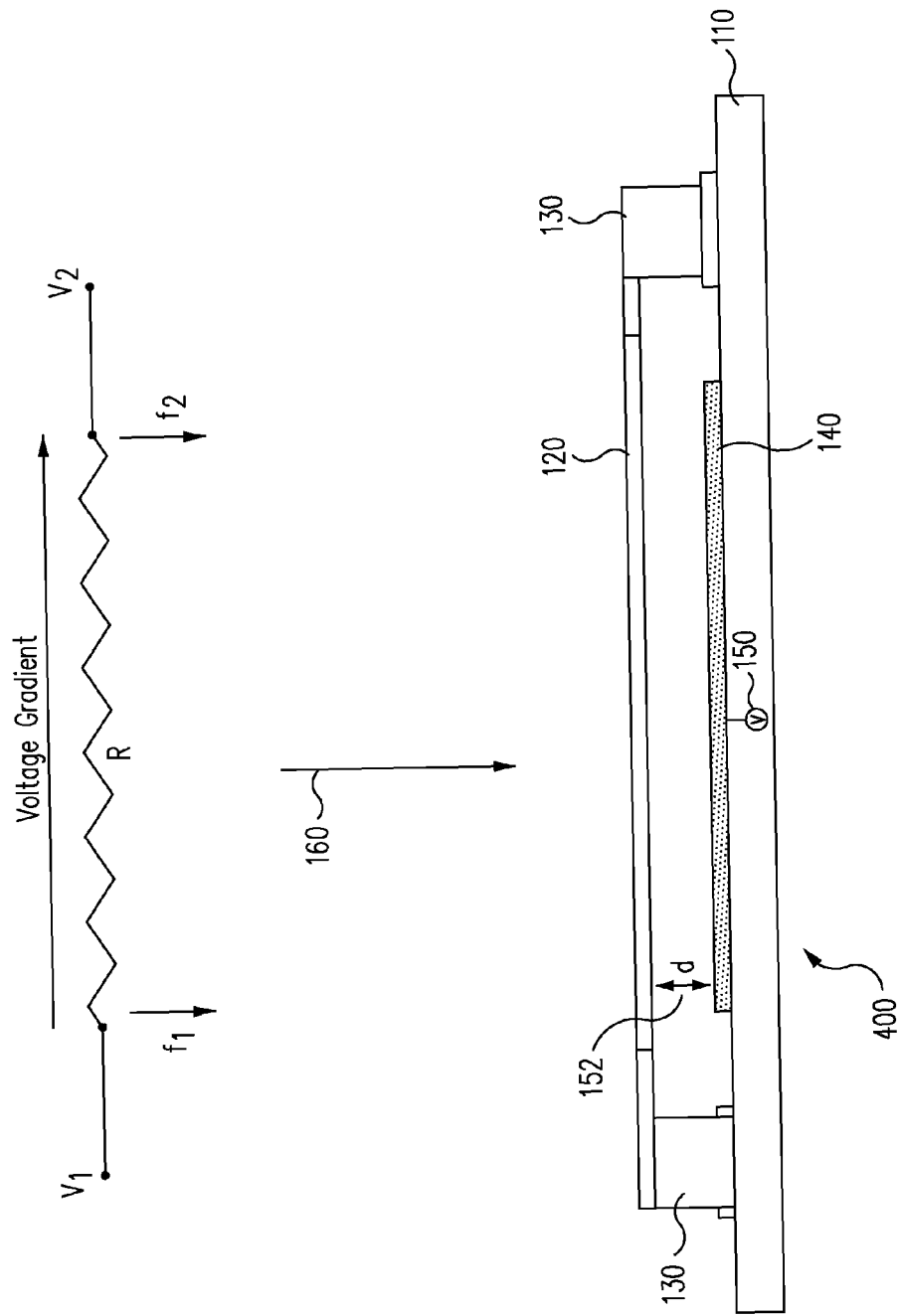

It should be understood that the voltage potential difference may or may not be uniform between reflective layer 140 and microbolometer 120 and in general may be viewed as an average voltage potential difference. For example as illustrated in FIG. 7b, the voltage potential difference may vary due to the voltage drop across microbolometer 120 resulting from a bias provided in a conventional fashion via legs 130 to measure the change in resistance of microbolometer 120 to incident infrared radiation detection. Specifically for example this is illustrated symbolically in FIG. 7b, with microbolometer 120 represented by a resistor (R) having a voltage drop (e.g., a voltage gradient) across the resistor R from a voltage ($V_1$) to a lesser voltage ($V_2$).

The voltage drop across the resistor R (i.e., microbolometer 120) may result in non-uniform forces (e.g., represented by different electrostatic force values ($f_1$ and $f_2$)), which may result in non-uniform distances of the spacing (d) between portions of reflective layer 140 and corresponding portions of microbolometer 120 and thus, non-uniform infrared performance by microbolometer 120. However, the voltage drop across microbolometer 120 may be insignificant relative to the voltage potential difference from the voltage biasing provided by voltage source 150 and, consequently, the spacing between reflective layer 140 and microbolometer 120 will remain approximately uniform.

Alternatively, the voltage biasing provided by voltage source 150 may be varied across reflective layer 140 (or a resistance across reflective layer 140 may be varied) to compensate for the expected differences in the voltage potential difference between reflective layer 140 and microbolometer 120. It should also be understood that, rather than providing the voltage biasing to reflective layer 140, a variable voltage bias (e.g., voltage source 150) may be provided to microbolometer 120 to provide the voltage potential difference between reflective layer 140 and microbolometer 120. In addition, variable voltage biasing may be provided to both reflective layer 140 and microbolometer 120, if desired, to provide the required voltage potential difference and vary the spacing for the desired applications.

Figure 7C:
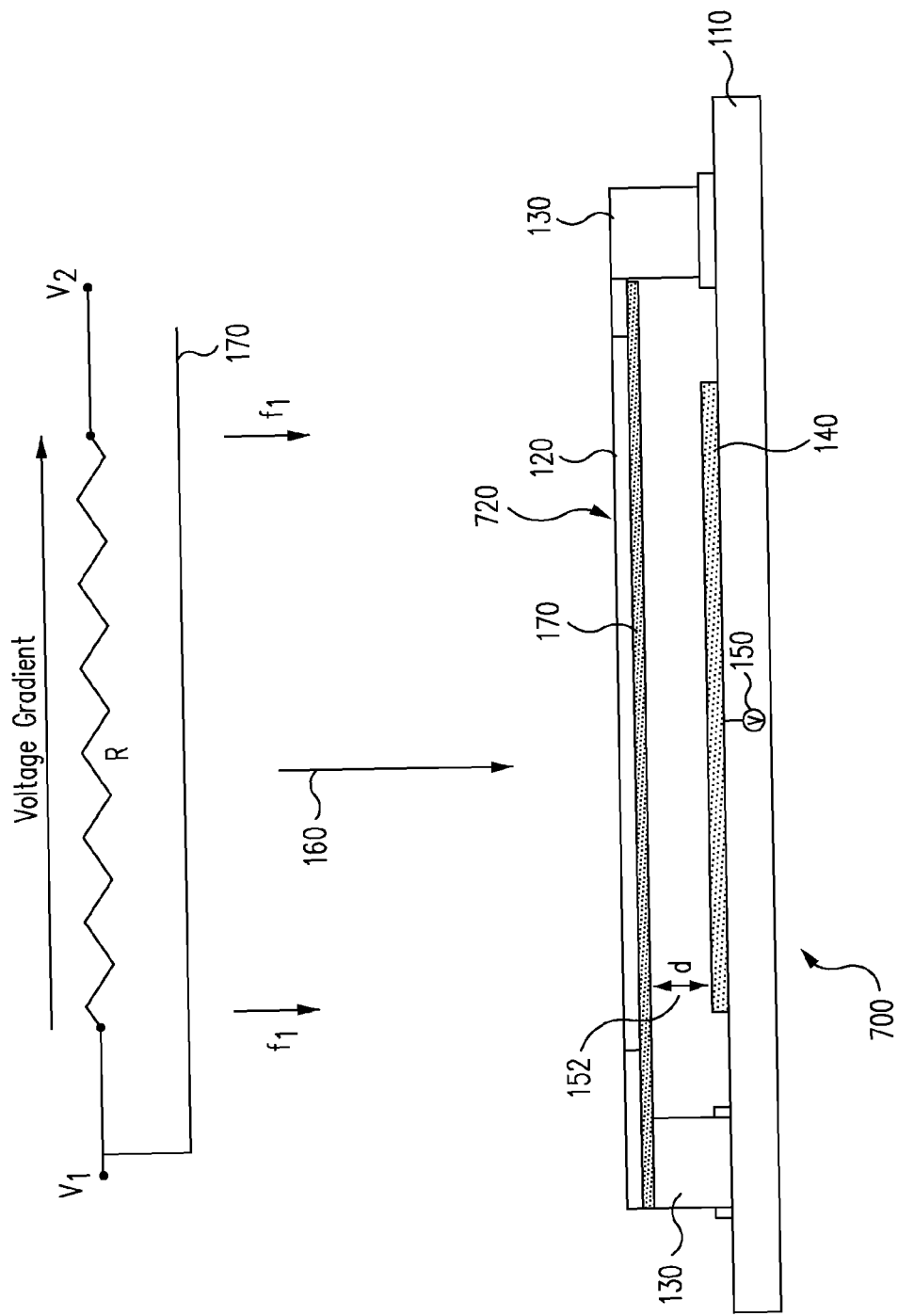
Figure 7D:
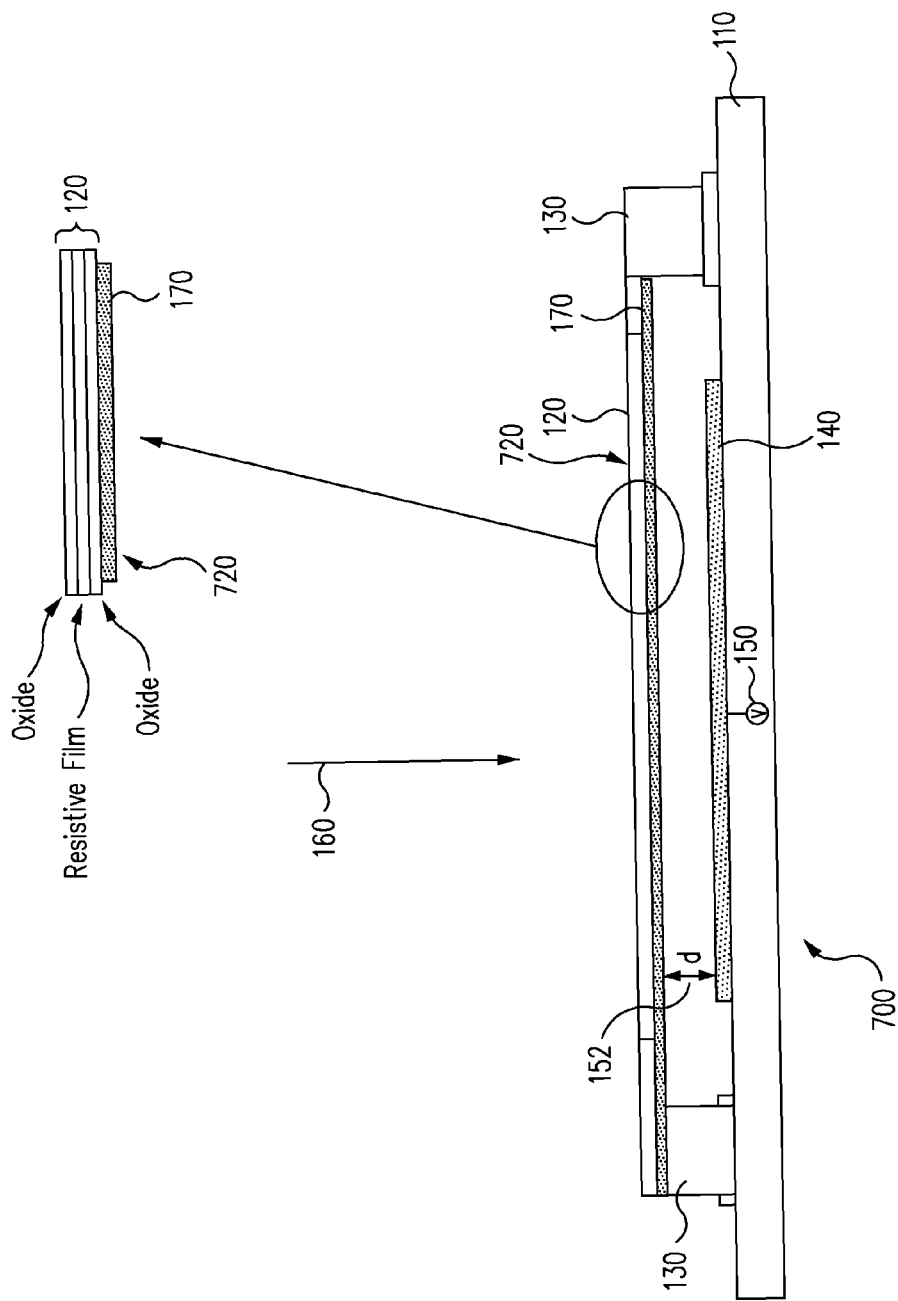

Alternatively in accordance with one or more embodiments of the present invention, microbolometer 120 may further include a separate biasing layer to maintain a uniform voltage potential relative to reflective layer 140 and provide the appropriate uniform spacing (d) for the desired application. For example, FIGS. 7c-7e show side views illustrating voltage biasing of a microbolometer array 700 in accordance with an embodiment of the present invention. Microbolometer array 700 is similar to microbolometer array 400 (e.g., FIG. 4), but further includes a conductive layer 170 that may be used as a reference plane and be coupled to microbolometer 120 to form a microbolometer 720.

Specifically for example this is illustrated symbolically in FIG. 7c, with microbolometer 120 represented by the resistor (R) and conductive layer 170 (e.g., an absorptive conductive film below the resistor (R)) coupled to the voltage ($V_1$) (but not to the voltage ($V_2$)) to provide a constant voltage plane (e.g., at a value of the voltage ($V_1$)) relative to a voltage applied by the voltage source 150 to reflective layer 140. Thus, uniform forces (e.g., represented by the same electrostatic force values ($f_1$)) may be exerted on microbolometer 720 and the spacing (d) may be uniform between microbolometer 720 and reflective layer 140 (e.g., microbolometer 720 does not tilt or otherwise deform due to non-uniform forces applied) so that microbolometer 720 may provide the desired infrared performance.

Conductive layer 170 may also provide certain additional advantages. For example, conductive layer 170 may aid in the absorption of infrared energy of microbolometer 120 by proper selection of resistance (e.g., sheet resistance) of conductive layer 170. As a specific example, conductive layer 170 having a determined sheet resistance (e.g., 350-850Ω/) for a specific microbolometer and infrared detection application may provide increased and more uniform infrared absorption (e.g., free carrier absorption or impedance matching of free space), as would be understood by one skilled in the art.

Microbolometer 720 may be formed using conventional techniques as would be understood by one skilled in the art, but with conductive layer 170 coupled to a voltage source (e.g., any type of source to provide a voltage, bias, and/or electrical charge onto conductive layer 170) in accordance with one or more embodiments of the present invention. For example, FIG. 7d illustrates an example of a cross-section of microbolometer 720 in accordance with an embodiment of the present invention.

Specifically as an example, microbolometer 720 may include (but not limited to) a resistive film layer (e.g., vanadium oxide (VOx)) between oxide layers (e.g., silicon dioxide), with conductive layer 170 (e.g., titanium nitride) below and coupled to one of the oxide layers. For example, the resistive film layer and the oxide layers may represent a specific example of a cross-section of microbolometer 120, while the addition of conductive layer 170 to microbolometer 120 forms a specific example of a cross-section of microbolometer 720. In general, microbolometers 120 and 720 may be formed using various known processing techniques and various types of conventional materials (e.g., such as with materials and processing techniques as disclosed in U.S. Pat. No. 5,021,663 or other conventional techniques), as would be understood by one skilled in the art.

Conductive layer 170 may be coupled to one of legs 130 (e.g., leg metal) to receive a voltage bias via one of contacts 132 (e.g., as shown in FIG. 1) on substrate 110. For example, conductive layer 170 may be coupled to the same voltage bias as provided to microbolometer 120 (e.g., but at only one leg 130), such as via a separate contact provided for this voltage bias to conductive layer 170 or by coupling conductive layer 170 to the same contact (e.g., on the microbridge or near the leg metal/microbridge interface) as used by the resistive film layer of microbolometer 720 or by using other conventional contact techniques to provide a suitable voltage bias to conductive layer 170, as would be understood by one skilled in the art.

Alternatively for example, conductive layer 170 may be coupled to a different voltage bias, than provided to microbolometer 120, via a separate voltage path through one of legs 130, as would be understood by one skilled in the art. As an example, if conductive layer 170 is provided with a separate voltage bias, this voltage bias may be used to control the spacing (d) between conductive layer 170 and reflective layer 140, while reflective layer 140 maintains a reference voltage (e.g., ground plane), or the spacing (d) may be controlled by varying the voltage biases on both conductive layer 170 and reflective layer 140. As a further example, conductive layer 170 may be provided with a constant reference voltage to provide a uniform voltage potential across a general area of microbolometer 720 and relative to a variable voltage bias provided to reflective layer 140.

Consequently, the spacing (d) may be varied by varying the voltage potential between reflective layer 140 and microbolometer 120 or 720 (e.g., as discussed previously in general in reference to FIGS. 4-7e) to modify the spectral properties of the resonant cavity associated with microbolometer 120 or 720. For example, a larger spacing (i.e., "d" increased) will enhance longer wavelength absorption (e.g., as illustrated in FIG. 7e), while a smaller spacing (i.e., "d" decreased) will enhance shorter wavelength absorption (e.g., as illustrated in FIG. 7d). Thus, microbolometer 120 or 720 will move away or towards reflective layer 140 by varying the potential difference (e.g., the voltage difference and/or polarity difference) between the electrically charged reflective layer 140 and the electrically charged microbolometer 120 or 720, which will result in a variation of the spectral response of microbolometer 120 or 720.

As noted previously, a conventional microbolometer FPA typically employs a mechanical shutter to perform a calibration process for the microbolometer FPA (e.g., to obtain desired calibration data, which may include correction terms, offsets, biases, and/or gain factors), as would be understood by one skilled in the art. However, the use of a mechanical shutter during the calibration process may have certain drawbacks, such as for example in terms of being a slow and imprecise mechanism relative to the electronics and microbolometer FPA capabilities. Furthermore, a mechanical shutter generally adds to the manufacturing costs of the infrared camera incorporating the microbolometer FPA, with the mechanical shutter typically having a number of mechanical components that may degrade the reliability, may increase power consumption, and possibly reduce or limit the overall performance of the infrared camera.

In contrast in accordance with one or more embodiments of the present invention, techniques disclosed herein may allow a calibration process to be performed for the microbolometer FPA (e.g., microbolometer array 400 or microbolometer array 700) without the use of a mechanical shutter. For example, FIGS. 7f and 7g show side views illustrating techniques for calibrating microbolometer array 700 in accordance with an embodiment of the present invention. However, it should be understood that the calibration techniques disclosed herein for microbolometer array 700 would also apply for microbolometer array 400, as would be understood by one skilled in the art.

Specifically, FIG. 7f illustrates microbolometer array 700 detecting infrared radiation (e.g., during normal infrared camera operation, with infrared radiation indicated generally by arrow 160) and, as discussed previously herein, with the spacing (d) adjusted appropriately (e.g., by adjusting a voltage potential between reflective layer 140 and conductive layer 170) to detect the desired infrared wavelengths. For example, an example of an infrared wavelength is shown symbolically as infrared wavelength 730, with the spacing (d) tuned such that the antinode (e.g., one quarter wavelength of infrared wavelength 730) occurs approximately at microbolometer 720 (e.g., as discussed previously in reference to FIG. 2) to provide maximum absorption of infrared radiation by microbolometer 720.

However in accordance with an embodiment, if it is desired to perform a calibration operation for microbolometer 720, the spacing (d) may be tuned (e.g., adjusted as discussed herein) such that the node (e.g., one half wavelength of infrared wavelength 730) occurs approximately at microbolometer 720 to minimize absorption of infrared radiation by microbolometer 720. Furthermore, an optical element 740 may be provided (e.g., as part of microbolometer array 700 or incorporated into an infrared camera system that includes microbolometer array 700) to block infrared radiation wavelengths that normally would be detected by microbolometer 720 at this spacing (d) during the calibration process. Consequently in accordance with an embodiment, with microbolometer array 700 tuned to infrared wavelengths that are not passed by optical element 740 (e.g., outside of the passband or within a stopband), a conventional calibration process may be performed without requiring a conventional mechanical shutter (e.g., to block infrared radiation and provide a desired reference image).

Optical element 740 may represent a conventional infrared window, infrared filter, and/or optics to pass desired infrared wavelengths and block undesired infrared wavelengths. As a specific example, optical element 740 may represent an infrared window with filtering functionality to provide a desired infrared radiation passband, such as for a desired infrared camera application.

The calibration process (e.g., during which the spacing (d) of microbolometer 720 adjusts to an infrared wavelength range outside of the passband of optical element 740) may be viewed, for example, as using an electronic blinking operation (e.g., an electronic version of the mechanical shutter by tuning the spacing (d) to a one half wavelength or "null" region). Thus, this calibration process in accordance with an embodiment may provide certain advantages over a conventional calibration process using a mechanical shutter, such as the elimination of slow, mechanical moving parts associated with the mechanical shutter and the ability to provide higher-speed and possibly more frequent electronic calibration operations. For example, on-FPA "null" and non-uniformity correction (NUC) operations may be performed electronically (e.g., including changing the spacing (d) at a relatively high speed) as needed, which may eliminate or reduce the need for a more time-consuming formal calibration process that would typically be required upon start-up or periodically during infrared camera operation.

In general in accordance with an embodiment, a calibration process is disclosed that detunes the optical cavity of the microbolometer (e.g., of microbolometer array 400 or microbolometer array 700) rather than moving a mechanical shutter into position to block the infrared radiation and provide a uniform reference image (e.g., a blackbody or "no signal" reference). Furthermore the microbolometer may use the optical element 740 as a virtual shutter due to the optical cavity being detuned in accordance with an embodiment such that optical element 740 may appear opaque (e.g., during the calibration process).

Figure 8:
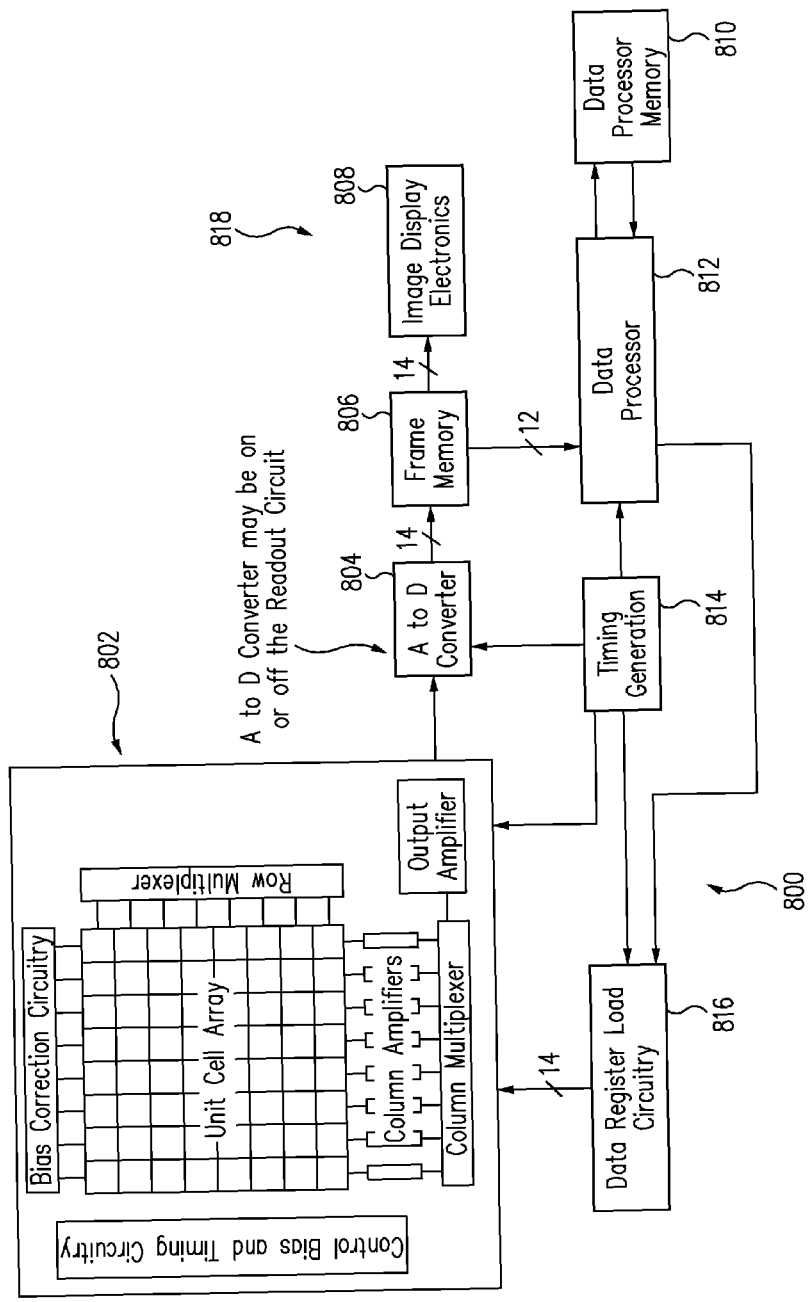
FIGS. 8 and 9 show block diagrams illustrating a microbolometer focal plane array and associated circuitry in accordance with an embodiment of the present invention.

FIG. 8 shows a block diagram 800 illustrating a microbolometer focal plane array 802 and interface system electronics 818, with uniformity-correction circuitry, in accordance with an embodiment of the present invention. For example, block diagram 800 may represent an infrared camera system utilizing the techniques disclosed herein to provide selectable spectrum performance.

Microbolometer focal plane array 802 includes a microbolometer array (labeled unit cell array) and a readout integrated circuit (ROIC) having control circuitry, timing circuitry, bias circuitry, row and column addressing circuitry, column amplifiers, and associated electronics to provide output signals that are digitized by an analog-to-digital (A/D) converter 804. The microbolometer array (unit cell array) of microbolometer focal plane array 802 may be formed by microbolometers as described in reference to FIGS. 1, 2, and 4-7g (e.g., an array of microbolometers 120 or an array of microbolometers 720). The ROIC of microbolometer focal plane array 802 may be employed to select the desired microbolometers for obtaining the desired output signals and may be constructed in a conventional manner.

The A/D converter 804 may be located on or off the ROIC. The output signals from A/D converter 804 are stored in a frame memory 806. The data in frame memory 806 is then available to image display electronics 808 and a data processor 812, which also has a data processor memory 810. A timing generator 814 provides system timing.

Data processor 812 generates uniformity-correction data words, which are loaded into a data register load circuitry 816 that provides the interface to load the correction data into the ROIC. In this fashion the digital-to-analog converters, and other variable circuitry, which control voltage levels, biasing, circuit element values, etc., are controlled by data processor 812 to provide the desired output signals from microbolometer focal plane array 802.

Data processor 812 may also generate the desired voltage biasing values for reflective layer 140 and/or conductive layer 170 to control the spacing (d) of the resonant cavity of corresponding microbolometers 120 or 720 of the unit cell array of microbolometer focal plane array 802. For example, data processor 812 via data register load circuitry 816 may control the spacing (d) of microbolometers 120 or 720 on a pixel-by-pixel basis (e.g., based upon calibration data) or on a global basis (e.g., by providing a global voltage bias value or corresponding global voltage bias values to all microbolometers 120 or 720). As another example, data processor 812 may also control the spacing (d) of the resonant cavity of corresponding microbolometers 120 or 720 to perform a calibration process (e.g., as discussed in reference to FIGS. 7f and 7g).

For the pixel-by-pixel basis, the performance may be tuned by calibrating each microbolometer 120 or 720 relative to voltage biasing, as would be understood by one skilled in the art, to determine the performance of each microbolometer 120 or 720 as the voltage bias varies. If a global signal for voltage biasing is provided to microbolometers 120 or 720, calibration may still be performed to calibrate the overall performance of microbolometers 120 or 720 (as a unit cell array) relative to voltage bias values. Consequently, the proper voltage bias may be applied, for example, individually to each microbolometer 120 or 720 or uniformly to the unit cell array to obtain the desired performance for the wavelength range or region of interest.

For example, a checkerboard pattern or other type of pattern may be provided based on the pixel-by-pixel approach to provide the desired wavelength responses of microbolometers 120 or 720 within microbolometer focal plane array 802. As a specific example, first, second, and third groups of microbolometers 120 or 720 may be designated to detect first, second, and third wavelengths, respectively, for a designated image at a designated timeframe. The groups may be formed in any fashion across microbolometer focal plane array 802, such as in a checkerboard-like repetitive pattern (e.g., first group pixel next to second group pixel next to third group pixel next to first group pixel in a repetitive pattern row after row) or in a stripe-like pattern of stripes of groups (e.g., first group pixels covering a first row or column, second group pixels covering a second row or column, third group pixels covering a third row or column, first group pixels covering a fourth row or column in a repetitive pattern) or in any other desired pattern of pixels having different spectrum responses. Thus, microbolometers 120 or microbolometers 720 may be controlled on a pixel-by-pixel basis to provide the desired tailored spectrum response, which may be used, for example, to provide the desired composite image data.

Figure 9:
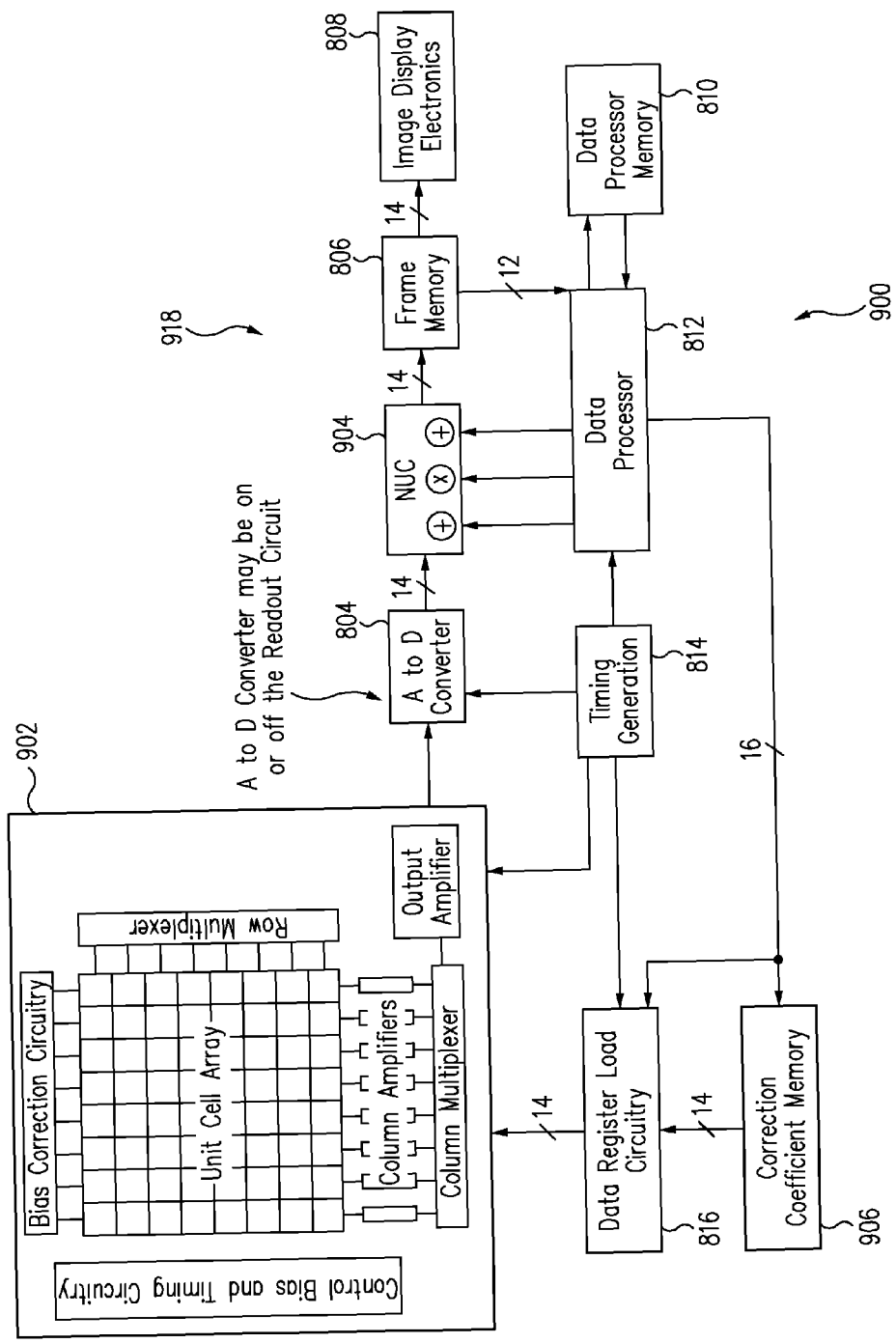

FIG. 9 shows a block diagram 900 illustrating a microbolometer focal plane array 902 and interface system electronics 918, with uniformity-correction circuitry, in accordance with an embodiment of the present invention. Block diagram 900 (e.g., an infrared camera system) is similar to block diagram 800, but includes additional techniques for providing, for example, temperature compensation and/or correction for various non-uniformities, as described in further detail for example in U.S. Pat. No. 6,812,465, issued Nov. 2, 2004, which is incorporated herein by reference in its entirety.

Microbolometer focal plane array 902 includes a microbolometer focal plane array (labeled unit cell array) and a readout integrated circuit (ROIC) having control circuitry, timing circuitry, bias circuitry, row and column addressing circuitry, column amplifiers, and associated electronics to provide output signals that are digitized by analog-to-digital (A/D) converter 804. The microbolometer array (unit cell array) of microbolometer focal plane array 902 may be formed by microbolometers as described in reference to FIGS. 1, 2, and 4-7g (e.g., an array of microbolometers 120 or an array of microbolometers 720). The ROIC of microbolometer focal plane array 902 may be employed to select the desired microbolometers for obtaining the desired output signals and may be constructed in a conventional manner.

The output signals from A/D converter 804 are adjusted by a non-uniformity correction circuit (NUC) 904, which applies temperature dependent compensation (e.g., Lagrange Offset, Temperature Dependent Gain, and additional Offset). After processing by NUC 904, the output signals are stored in a frame memory 806. The data in frame memory 806 is then available to image display electronics 808 and data processor 812, which also has data processor memory 910.

Data processor 812 generates uniformity-correction data words, which are loaded into a correction coefficient memory 906. As discussed similarly in reference to FIG. 8 for example, data processor 812 may also generate the desired voltage biasing for each reflective layer 140 and/or conductive layer 170 to control the spacing (d) of the resonant cavity of corresponding associated microbolometers 120 or microbolometers 720 of the unit cell array of microbolometer focal plane array 902 (e.g., on an individual basis or on a single global signal basis). Furthermore as another example, data processor 812 may also control the spacing (d) of the resonant cavity of corresponding microbolometers 120 or 720 to perform a calibration process (e.g., as discussed in reference to FIGS. 7f and 7g), such as for example to determine the appropriate NUC calibration terms (e.g., NUC gain and/or offsets).

The voltage biasing may be provided to correction coefficient memory 906 or directly to data register load circuitry 816, which provides the interface to load the correction data into readout integrated circuit 902. In this fashion the variable resistors, digital-to-analog converters, and other variable circuitry, which control voltage levels, biasing, circuit element values, etc., may be controlled by data processor 812 so that the output signals from the readout integrated circuit are uniform over a wide temperature range and over the desired wavelength regions of interest.

It should be understood that block diagrams 800 and 900 provide examples of infrared camera systems and that the various techniques disclosed herein in accordance with one or more embodiments are not limited to these specific infrared camera systems, as would be understood by one skilled in the art. In general, for example in accordance with an embodiment, an infrared camera system may include a microbolometer FPA, a logic device (e.g., a processor, an application specific integrated circuit, or a programmable logic device), a memory (e.g., either discrete or within the logic device), and optionally a display for viewing by a user of the infrared camera system. Thus, for example, block diagrams 800 and 900 may represent specific implementation examples of this more general system, with various elements of block diagram 800 or block diagram 900 combinable, as would be understood by one skilled in the art.

Systems and methods are disclosed herein to provide microbolometer resonant cavity tuning techniques and calibration techniques in accordance with embodiments of the present invention. For example, in accordance with an embodiment of the present invention, a tunable microbolometer resonant cavity is disclosed that may be used to exploit the substantial degree of variability of absorptance relative to air gap for the microbolometer structure. As disclosed herein, by varying the resonant cavity dimensions (e.g., by moving the microbolometer away from or towards the associated substrate), the microbolometer's spectral absorption properties are changed, which results in a change in the spectrum range being imaged.

As a specific example in accordance with an embodiment, a variable bias (e.g., a variable voltage) was provided to the substrate's reflective metal layer and/or conductive layer (if implemented) to control the distance between the microbolometer and the reflective metal layer (e.g., provide a tuned resonant cavity (e.g., one-quarter wavelength optical cavity) that determines peak wavelength of the microbolometer's response). The resonant cavity dimensions (e.g., cavity resonance) may be varied rapidly (e.g., the variable voltage change may be performed in the kilohertz frequency range—a voltage change in milliseconds or less) to measure the desired infrared spectrum ranges.

Thus for example, by controlling the variable bias or biases to control the microbolometer's resonant cavity (e.g., tunable microbolometers), uncooled color performance over a selective range of wavelengths may be provided, such as for multi-spectral applications. For example, the microbolometer's peak wavelength response may be varied for various detection applications, such as for gas detection or discrimination, emissivity determination for thermography applications, image differencing applications (e.g., imaging a scene over different wavelengths for comparison, contrasting, and other differencing applications). Consequently, the multi-spectral applications may include, for example, various conventional techniques, which previously required multiple infrared cameras and/or filters.

As another specific example in accordance with an embodiment, the microbolometer resonant cavity may be tuned to perform a calibration operation, without the use of a conventional mechanical shutter. For example, the microbolometer resonant cavity within an infrared camera may be tuned to a wavelength range that is outside of the passband of the infrared camera's optics (e.g., filter or window) to perform a calibration operation. Consequently as an example in accordance with an embodiment, a conventional calibration process may be performed without requiring the use of a conventional mechanical shutter, which may provide certain advantages in terms of speed, reliability, and manufacturing costs relative to conventional infrared camera systems.

Embodiments described above illustrate but do not limit the invention. It should also be understood that numerous modifications and variations are possible in accordance with the principles of the present invention. Accordingly, the scope of the invention is defined only by the following claims.

What is claimed is:

1. An infrared camera system comprising:
    an optical element adapted to pass infrared frequencies of a first range of wavelengths and block infrared frequencies of a second range of wavelengths;
    a substrate;
    a plurality of microbolometers coupled to the substrate to form corresponding microbolometer resonant cavities, wherein the microbolometers are disposed to receive the first range of wavelengths passed by the optical element;
    a plurality of reflective layers disposed on the substrate and corresponding to the plurality of microbolometers; and
    at least one voltage source adapted to provide a variable voltage potential to vary a spacing of the microbolometer resonant cavities between the reflective layers and the corresponding microbolometers, wherein the at least one voltage source is adapted to provide at least a first voltage potential during a calibration process of the microbolometers to set the spacing corresponding to the microbolometers detecting the second range of wavelengths.

2. The infrared camera system of claim 1, wherein each of the microbolometers includes a biasing layer configured to provide an approximately uniform voltage reference plane, with the variable voltage potential applied between the biasing layer and the reflective layer, and wherein the at least one voltage source further provides the variable voltage potential to selectively vary a spectral response of each of the microbolometers by changing dimensions of the corresponding microbolometer resonant cavity.

3. The infrared camera system of claim 1, wherein the at least one voltage source comprises a plurality of the voltage sources coupled to the corresponding reflective layers to provide the corresponding variable voltage potentials.

4. The infrared camera system of claim 3, wherein the variable voltage potentials are further provided on a calibrated pixel-by-pixel basis such that the microbolometers are individually tunable for different wavelengths.

5. The infrared camera system of claim 1, further comprising legs corresponding to the plurality of microbolometers, wherein the legs support the microbolometers above the substrate and electrically couple the microbolometers to the substrate, and wherein the legs allow the microbolometer to move towards or away from the substrate based on the variable voltage potentials.

6. The infrared camera system of claim 1, wherein the substrate includes a read out integrated circuit for the microbolometers, and wherein the spacing corresponding to the microbolometers detecting the second range of wavelengths is approximately equal to one-half wavelength of at least one wavelength within the first range of wavelengths.

7. The infrared camera system of claim 1, wherein the substrate, the microbolometers, and the reflective layers form a focal plane array, and wherein the infrared camera system further comprises a processor coupled to the focal plane array and adapted to provide uniformity correction data and the variable voltage potentials to the focal plane array to provide a substantially uniform performance over a wide temperature range and over selectable wavelength regions.

8. The infrared camera system of claim 1, wherein the calibration process determines a calibration offset for each of the microbolometers based on a signal response of the microbolometers while set to the spacing corresponding to the microbolometers detecting the second range of wavelengths.

9. An infrared camera system comprising:
an optical element adapted to pass an infrared frequency of a first wavelength and block an infrared frequency of a second wavelength;
a microbolometer focal plane array comprising:
a substrate; and
an array of microbolometers disposed on the substrate and forming a corresponding cavity between each of the microbolometers and the substrate; and
means for varying a dimension of the cavity for each of the microbolometers to vary spectral absorption properties of the microbolometers, wherein the varying means sets the dimension of the cavities to tune the spectral absorption properties of the microbolometers to the second wavelength during calibration.

10. The infrared camera system of claim 9, wherein each of the microbolometers includes a conductive layer corresponding to a reflective layer on the substrate, and wherein the varying means is further adapted to provide uniformity correction data to the microbolometer focal plane array.

11. The infrared camera system of claim 9, wherein the varying means sets the dimension of each of the cavities to a spacing between each of the microbolometers and the substrate of approximately one-half wavelength of the first wavelength during calibration.

12. The infrared camera system of claim 9, wherein the substrate further comprises a read out integrated circuit for the array of microbolometers.

13. The infrared camera system of claim 9, wherein the varying means provides selectable multi-spectral performance based on individual or groups of the microbolometers.

14. A method of operating an array of microbolometers on a substrate of an infrared camera system, the method comprising:
filtering with an optical element infrared radiation to pass a first infrared radiation wavelength and to block a second infrared radiation wavelength, wherein the first infrared radiation wavelength is different than the second infrared radiation wavelength;
setting a spacing between the microbolometers and the substrate to approximately tune the microbolometers to the second infrared radiation wavelength which is blocked by the filtering; and
determining calibration data for the microbolometers with the microbolometers approximately tuned by the setting to the second infrared radiation wavelength.

15. The method of claim 14, wherein the spacing to tune the microbolometers to the second infrared radiation wavelength is approximately one-half wavelength of the first infrared radiation wavelength.

16. The method of claim 14, further comprising changing a spacing between the microbolometers and the substrate to approximately tune the microbolometers to the first infrared radiation wavelength, which is passed by the filtering, to provide infrared image data based on the first infrared radiation wavelength.

17. The method of claim 16, further comprising:
providing uniformity correction data to provide temperature compensation for the microbolometers;
receiving output signals from the microbolometers corresponding to the first infrared radiation wavelength; and
storing the infrared image data.

18. The method of claim 16, wherein the infrared camera system based on the changing provides uncooled color performance over selective wavelength regions.

19. The method of claim 16, further comprising performing multi-spectral analysis on the infrared image data to provide gas detection, image differencing, or emissivity determination.

20. The method of claim 14, wherein the changing the spacing between the microbolometers and the substrate is calibrated individually for each of the microbolometers to provide uniform spectral responses.

* * * * *